United States Patent [19]
Janes

[11] Patent Number: 5,843,214
[45] Date of Patent: Dec. 1, 1998

[54] CONDENSABLE VAPOR CAPTURE AND RECOVERY IN INDUSTRIAL APPLICATIONS

[75] Inventor: Clarence W. Janes, Sacramento, Calif.

[73] Assignee: California Energy Commission, Sacramento, Calif.

[21] Appl. No.: 749,389

[22] Filed: Oct. 31, 1996

Related U.S. Application Data

[60] Provisional application No. 60/007,111 Oct. 31, 1995.

[51] Int. Cl.$^6$ .................................................. B01D 47/06
[52] U.S. Cl. ............................. 96/242; 55/315.2; 95/194; 95/214; 95/225; 95/229; 95/288; 96/322; 96/361
[58] Field of Search .............................. 95/187, 194, 214, 95/228, 229, 225, 288, 289, 280; 55/222, 220, 267, 268, 269, 240, 259, 257.7, 257.1; 59/315.2; 96/242, 322, 361

[56] References Cited

U.S. PATENT DOCUMENTS

| | | | |
|---|---|---|---|
| T900,004 | 7/1972 | Lauderback | 95/187 |
| 2,192,126 | 2/1940 | Downs | 95/194 |
| 2,279,938 | 4/1942 | Crawford | 95/194 |
| 2,280,633 | 4/1942 | Crawford | 95/194 |
| 2,367,695 | 1/1945 | Spiselman | 95/228 |
| 2,798,570 | 7/1957 | Kelley | 95/194 |
| 2,852,090 | 9/1958 | Kelley | 95/194 |
| 2,876,833 | 3/1959 | Kelley et al. | 55/222 |
| 2,899,012 | 8/1959 | Davis | 95/229 |
| 3,232,029 | 2/1966 | Evans, Jr. | 95/229 |
| 4,574,062 | 3/1986 | Weitman | 55/222 |
| 4,799,941 | 1/1989 | Westermark | 95/225 |
| 5,080,696 | 1/1992 | Marchand et al. | 95/187 |
| 5,391,220 | 2/1995 | Patterson | 95/187 |
| 5,534,230 | 7/1996 | Johnson et al. | 55/222 |

Primary Examiner—Duane S. Smith
Attorney, Agent, or Firm—John P. O'Banion

[57] ABSTRACT

An apparatus for extracting condensable materials from exhaust gases which are produced by combustion. In a steam injected gas turbine driven powerplant, water is extracted from the exhaust gasses and returned to the cycle for steam raising and injection into the combustor. Exhaust gases pass flow co-currently with a cold water fog, water vapor in the fog condenses on the fog drops, the flow passes through a de-mister coalescing the drops so as to produce a warm rain of condensate, the condensate is cooled with a heat exchanger using a cooling medium such as seawater, and the cooled condensate is returned to the cycle.

23 Claims, 4 Drawing Sheets

CONDENSABLE VAPOR CAPTURE AND RECOVERY IN INDUSTRIAL APPLICATIONS

CROSS-REFERENCE TO RELATED APPLICATIONS

This application is a continuation-in-part of provisional application Ser. No. 60/007,111 filed on Oct. 31, 1995 now abandoned, and claims the priority thereof.

BACKGROUND OF THE INVENTION

1. Field of the Invention

This invention pertains to recovery of condensable materials from an industrial exhaust gas stream, such as recovery of makeup water for a steam injected gas turbine cycle, and further to treatment of acid condensation when sulfur is present in an exhaust stream and/or removing pollutants from the exhaust stream.

2. Description of the Background Art

In a number of industrial situations involving the combustion of fossil fuel, it can be desirable to remove condensable products of combustion from the exhaust stream. One such situation would be the need for an economical way to recover water injected into the combustor of a gas turbine for power augmentation and/or control of $NO_x$ emissions. Another such situation would be the need to control or deal with acid condensation where the exhaust stream contains significant quantities of sulfur, sulfur oxides, and water and where an objective is to cool the exhaust stream below the acid dew point. A further situation could be the desire for an efficient and economical method of removing pollutants from an exhaust stream. The present invention satisfies these needs, as well as others, and overcomes deficiencies in prior art approaches.

The power produced by a gas turbine can be augmented by injecting steam into the combustor. Additionally, the steam lowers the peak temperatures in the combustor which significantly reduces $NO_x$ formation. The steam required is most often raised in a boiler using the heat in the gas turbine exhaust flow, but other configurations are also possible as described in my previous patent, U.S. Pat. No. 5,490,377.

An alternative (and more conventional) design for a powerplant is to route the steam raised in the heat recovery boiler to a separate steam turbine/condenser/cooling tower cycle that returns condensate as makeup feedwater to the boiler. This combined gas turbine/steam turbine cycle has the additional capital expense and lower plant availability associated with owning and operating the additional steam cycle equipment required in the combined cycle powerplant.

The heat recovery boiler operates with no moving parts. Thus, the steam injected gas turbine powerplant exhibits both a lower capital cost and a higher plant availability factor that is set by the gas turbine availability alone.

Despite the successful introduction and acceptance of steam injected gas turbine cycles, their application is entirely dependent on a reliable and economic source of makeup boiler feedwater of high quality. While the steam cycle requires makeup water (1% to 5%), the steam injected gas turbine cycle requires 100% makeup water. The cost of this water can be a significant operating cost, if not prohibiting the application entirely.

Condensation and recovery of cycle water is a well established procedure in a steam cycle. A cooled metal tube surface will readily condense pure (100%) water vapor leaving the steam turbine's last low pressure stage. By contrast, the exhaust gas leaving the stack of the steam injected gas turbine may be approximately 30% water vapor, but the 70% remaining noncondensable gasses presents a heretofore insurmountable problem for the economic condensation and recovery of the water content. This is because the heat transfer coefficient is an order of magnitude lower with the noncondensable gas present. Moreover, the condensable "acid gas" content of many fossil fuels is sufficiently corrosive as to require Teflon coated condenser tubes. The cost of recovering the water content of such gas turbine exhaust in this "conventional" manner can therefore exceed the cost of upgrading seawater to feedwater makeup quality.

SUMMARY OF THE INVENTION

The present invention addresses the requirement of providing high quality water for steam injection by establishing a closed loop recovery system in which water is extracted from the exhaust gas stream and returned to the cycle. Accordingly, a steam injected gas turbine powerplant in accordance with the present invention can be located in places on land or at sea that would otherwise be unsuitable for such a powerplant.

By way of example, and not of limitation, the stack gas in a steam injected gas turbine is approximately 30% by volume water vapor, the partial pressure of water vapor is approximately 0.3 atmospheres, and the dew point is on the order of 161° F. The problem to be addressed is that recovery of this amount of water vapor in such a large volume of exhaust gas requires a very large amount of condensing surface. In addition, where fuels contain significant quantities of sulfur, the problem of acid formation and condensation must also be taken into account, as explained more fully below. Systems have been commercially offered for recovery of water using conventional tube condensers, but these systems are generally not cost effective because (1) a very large amount of tubing is required to provide adequate surface for condensation when only about 30 percent of the flow is condensable water and the rest is non-condensable air and products of combustion, and (2) the tubing must be Teflon coated in order to deal with the acid formation problem. This invention addresses these problems in a different way—by providing the required surface of billions of tiny cold water fog droplets introduced into the exhaust gas path concurrent with its flow. These fog droplets are so small that the charge on the surface of the droplets is sufficient to cause them to repel each other, creating a uniform dispersion of droplets with their associated condensing surface area. As this fog travels through the exhaust stack with the exhaust gas, water vapor molecules condense on the surface of the cold water fog droplets, causing them to grow. These droplets are later de-entrained and coalesce in a de-mister pad which causes them to fall by gravity like warm rain into a reservoir. From this reservoir, the warm condensate can be pumped to a heat exchanger for cooling prior to its recycling into the gas turbine cycle and further use in the water recovery fogging system. This heat exchanger would use seawater or another cooling water source if available. The cooling required to make the invention work could also be obtained through the use of an air-cooled heat exchanger if a source of cooling water is not available.

The surface of a sphere (droplet of water fog) is a function of the square of its radius, while the volume of the sphere (and thus also its weight) is a function of the cube of its radius. For a given mass of water fog, as the radius of the droplets decreases, the volume per droplet will also decrease and the number of droplets will therefore increase much more rapidly than the rate at which the surface of each drop will diminish. Because the total surface of the droplets will be a function of the surface of each droplet times the number of droplets, it is plain that the smaller the droplets, the more of them in a pound of water and the larger the total surface area per pound of water fog. Available de-mister pads will effectively break the fogged condensate so long as the droplets are at least 3 microns in size which would provide more than adequate condensing surface. However, it will require more pumping power to produce smaller fog droplets, and therefore, to minimize the power requirement for the water recovery system, the droplets will be larger than 3 microns, sized as large as possible consistent with the need for effective condensation within the available space. In any event, the introduction of a very small amount of nonionic surfactant into the water used for fogging will permit the pumping requirement to be greatly reduced (by about half) due to the consequent reduction in the surface tension.

An additional problem that must be addressed where the powerplant uses fuel that contains some sulfur is that an acid dew point exists at a temperature higher than the water dew point. In some power plants, this potential for acid deposition on the exhaust stack and heat recovery equipment causes this equipment to be designed to allow the exhaust to escape to the atmosphere before the acid dew point is reached. Because this water recovery design requires the exhaust gas to be cooled to the dew point of water, a method of capturing and neutralizing developing acid must be devised in order to avoid corrosion of equipment that may come in contact with such acid deposits. Fortunately, the same water fogging surface condensation strategy can be employed at the point in the stack where acid condensation is expected to occur, and because the water fog will be cold, any $SO_2$ or $SO_3$ molecules that may exist at that point in the exhaust gas will preferentially condense at the surface of the fog droplets rather than on metal components. The dilute acid captured in a reservoir at this point in the stack can then be treated with barium carbonate to precipitate out highly insoluble barium sulfate and neutralize the acid. This technique may also be employable as a low cost method of removing harmful sulfur oxide emissions, and other condensable or entrainable emissions (such as HCL or $PM_{10}$) from the stack gasses of other kinds of power plants (such as coal fired or trash burning powerplants) even if water recovery is not an objective.

An object of the invention is to provide for recovery of water present in the exhaust gases of a steam injected gas turbine driven powerplant.

Another object of the invention is to provide a closed loop system for raising steam from water recovered from exhaust gasses in a steam injected gas turbine driven powerplant.

Another object of the invention is to provide an economical source of feedwater for a steam injected gas turbine driven powerplant.

Another object of the invention is to provide for conservation of natural resources, such as water.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DESCRIPTION OF THE PREFERRED EMBODIMENTS

Figure 1:
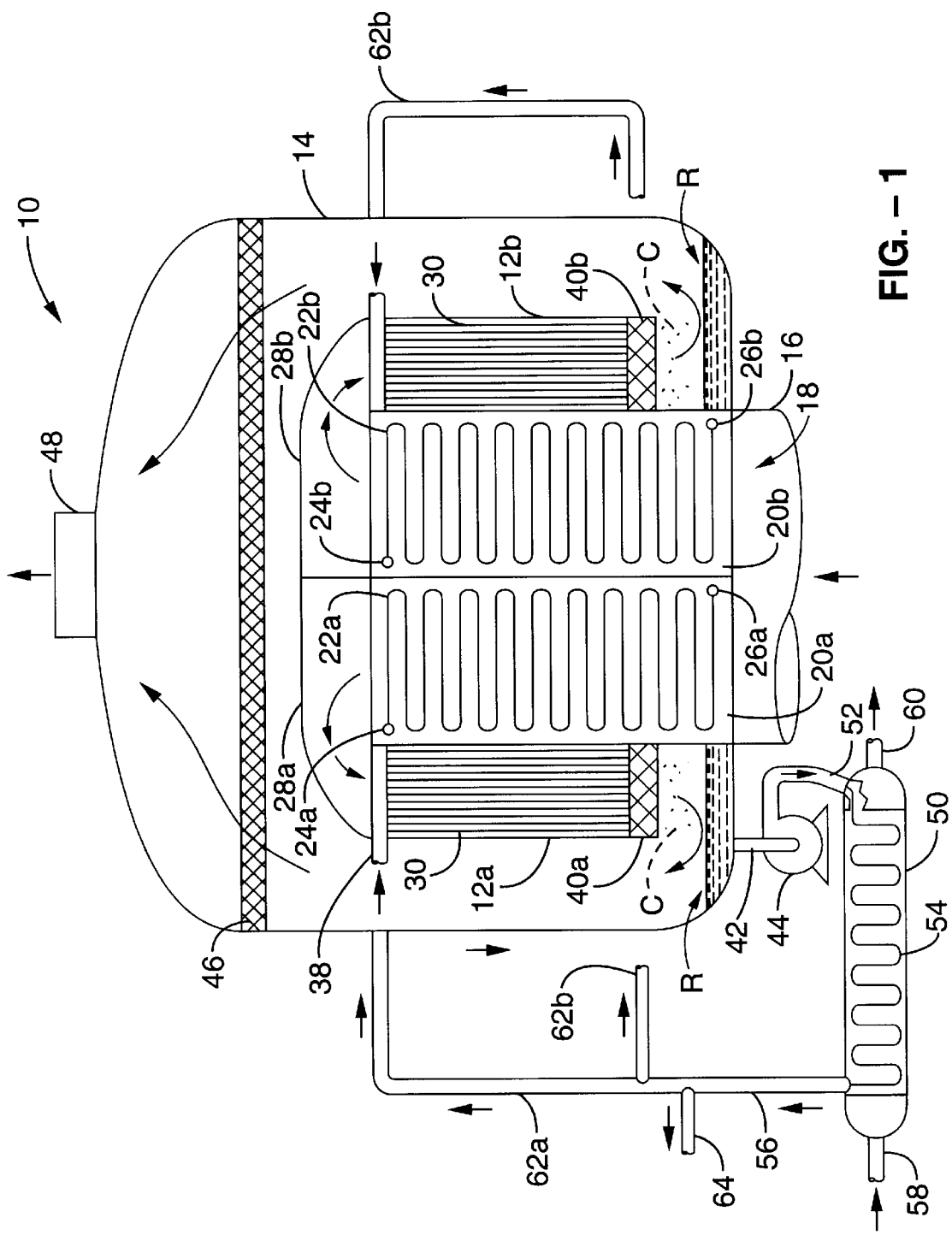
FIG. 1 is a schematic diagram of an exhaust gas water recovery apparatus in accordance with the present invention.
Figure 2:
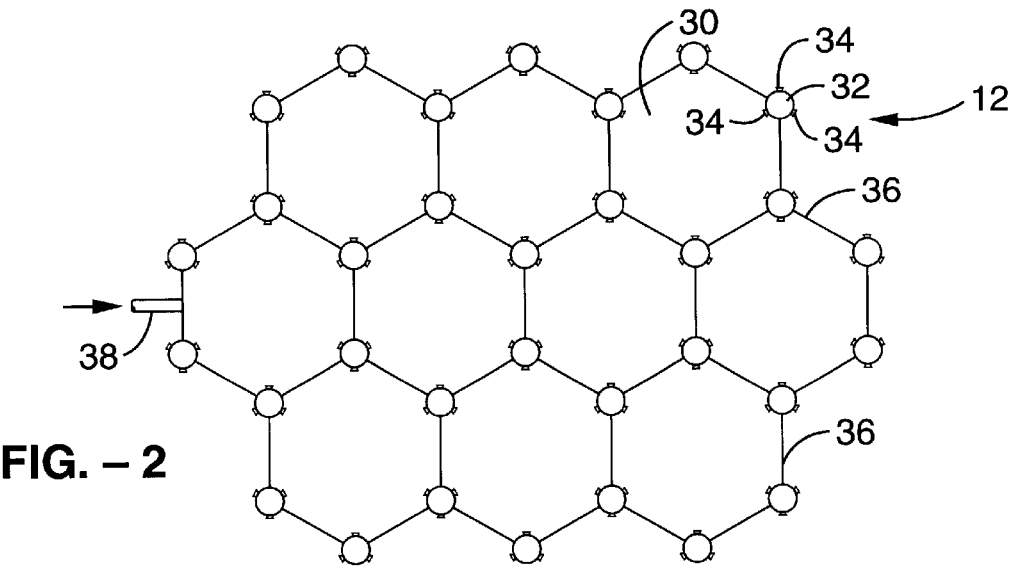
FIG. 2 is a top plan view of a exhaust gas water condenser array employed in the apparatus shown in FIG. 1.
Figure 3:
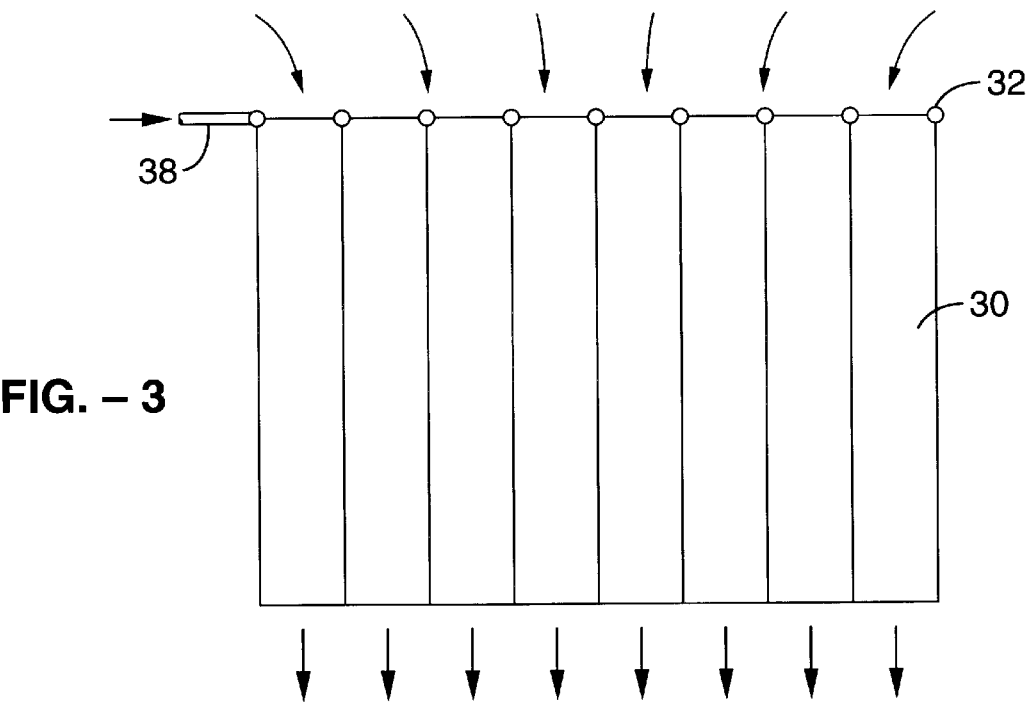
FIG. 3 is a side elevational view of the exhaust gas water condenser array shown in FIG. 2.

Referring more specifically to the drawings, for illustrative purposes the present invention is embodied in the apparatus generally shown in FIG. 1 through FIG. 9, where like reference numerals denote like parts. It will be appreciated that the apparatus may vary as to configuration and as to details of the parts without departing from the basic concepts as disclosed herein.

Referring first to FIG. 1, an exhaust gas water recovery unit 10 in accordance with the present invention is generally shown. The apparatus can be used in conjunction with a steam injected gas turbine driven powerplant, such as described in my previous patent, U.S. Pat. No. 5,490,377 which is incorporated by reference herein, and in my previous application Ser. No. 08/546,729, now U.S. Pat. No. 5,590,518, which is also incorporated by reference herein. It will be appreciated, however, that those powerplants are exemplary only, and that the present invention can be used in conjunction with any steam injected powerplant. It will further be appreciated that the present invention may be used to recover water and other condensable materials from exhaust gasses produced through any combustion process, such as those produced by from boilers, furnaces and other types of combustion units.

In exhaust gas water recovery unit 10, water is extracted from the exhaust gas stream through the use of a direct-contact cold water fog condenser array, shown in FIG. 1 as condensers 12a, 12b, which are housed within containment vessel 14. The exhaust gasses enter containment vessel 14 through an exhaust gas inlet 16 and pass over the coils of an exhaust heat recovery unit 18, which can be a conventional plate-fin or tubed heat exchanger (e.g., recuperator), heat recovery steam generator, or the like heat recovery unit. In the embodiment shown, heat recovery unit 18 contains sections 20a, 20b corresponding to condensers 12a, 12b and the exhaust gasses are divided into two flows which pass over the coils 22a, 22b of sections 20a, 20b, respectively. It will be appreciated that a single section heat recovery unit could alternatively be employed, or that sections 20a, 20b of heat recovery unit 18 could be configured in various combinations of heat exchangers and heat recovery steam generators.

Coils 22a, 22b have cold fluid inlets 24a, 24b, respectively, as well as hot fluid outlets 26a, 26b, respectively. The inlet fluid can be air, water, combustible fuel, a mixture of combustible fuel and water, or other heat transfer fluid to which heat is transferred from the exhaust gasses as the fluid flows through the coils in the heat recovery unit. Where water alone is used as a coolant, or where a two-phase feed of combustible fuel and water is used, steam will be raised and the heated fluid output would be steam or a steam/combustible fuel mixture, respectively, either of which can be used in a combustion cycle as described in my previous patents referenced above. Alternatively, process steam alone could be raised. It will also be appreciated that the inlet fluid could be cooled air from a high pressure heat exchanger downstream of the final compressor stage in a powerplant as described in U.S. Pat. No. 5,490,377.

Figure 4:
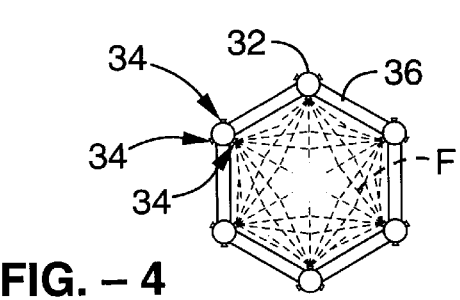
FIG. 4 is a top plan view of a fogging chamber employed in the exhaust gas water condenser array shown in FIG. 2 and FIG. 3.
Figure 5:
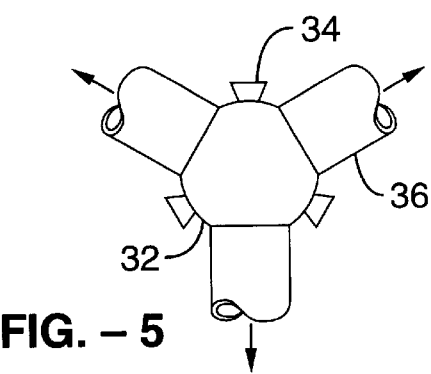
FIG. 5 is an enlarged top plan fragmentary view of a fogging nozzle employed in the exhaust gas water condenser array shown in FIG. 2 through FIG. 4.

The cooled exhaust gasses are ducted to condensers 12a, 12b through ducts 28a, 28b, respectively. Referring also to FIG. 2 through FIG. 5, each condenser comprises a plurality of hexagonal-shaped channels 30 through which the exhaust gasses pass in a downward direction. A plurality of fogging nozzles 32 are positioned in an array as shown, with one fogging nozzle 32 located at each point of the hexagon. Fogging nozzles 32, each of which include a plurality of fog generators 34, are interconnected though a plurality of water pipes 36 which are fed by a water inlet 38. As can be seen in FIG. 4, fog generators 34 produce overlapping sprays of fog F, at the entrance of each channel 30. While a hexagonal configuration provides for uniform fogging, other shapes and configurations could be employed. Devices which produce a fog of fine droplets and which are suitable for fog generators 34 include "The Mee Fog Nozzle" available from Mee Industries, Inc. of El Monte, Calif. and "FogJet Spray Nozzles" available from Spraying Systems Co., of Wheaton, Ill.

As a result, a direct-contact cold water fog is produced which cools the passing exhaust gasses and causes the water contained in the exhaust gasses to condense on the surface of the fog droplets. In this regard, note that fogging nozzles 32 will introduce billions of tiny cold water fog droplets into the exhaust gas path concurrent with its flow. These fog droplets are so small that the charge on the surface of the droplets is sufficient to cause them to repel each other, creating a uniform dispersion of droplets with their associated condensing surface area. As this fog travels through the exhaust stack with the exhaust gas, water vapor molecules condense on the surface of the cold water fog droplets, causing them to grow.

Referring again to FIG. 1, as the water condenses the mist impinges on mesh screens 40a, 40b which serve as de-misters to cause water droplets or condensate C to fall into a lower reservoir area R where the water is pumped through outlet 42 for recirculation by a pump 44. It will be appreciated that the surface of a sphere (droplet of water fog) is a function of the square of its radius, while the volume of the sphere (and thus also its weight) is a function of the cube of its radius. For a given mass of water fog, as the radius of the droplets decreases, the volume per droplet will also decrease and the number of droplets will therefore increase much more rapidly than the rate at which the surface of each drop will diminish. Because the total surface of the droplets will be a function of the surface of each droplet times the number of droplets, it will further be appreciated that the smaller the droplets, the more of them in a pound of water and the larger the total surface area per pound of water fog. The relationship between the drop size, drop surface, and total surface per unit weight of fogged water is illustrated in Table 1. Column 1 shows the drop diameter in microns with successive drops being arbitrarily one half the diameter of the proceeding drop. Column 2 shows the weight (mass) in grams of each successive drop. Column 3 shows the number of molecules of water in each of the progressively smaller drops. Column 4 shows the surface in square centimeters for each of the progressively smaller drops. Column 5 shows the total surface generated per gram of water fogged.

Available de-mister pads will effectively break the fogged condensate so long as the droplets are at least 3 microns in size which would provide more than adequate condensing surface. However, it will require more pumping power to produce smaller fog droplets, and therefore, to minimize the power requirement for the water recovery system, the droplets should be larger than 3 microns, sized as large as possible consistent with the need for effective condensation within the available space. In any event, the introduction of a very small amount of nonionic surfactant into the water used for fogging will permit the pumping requirement to be greatly reduced (by about half) due to the consequent reduction in the surface tension.

As can be seen, therefore, the droplets are de-entrained in de-misters 40a, 40b which causes the droplets to fall like warm rain into reservoir R. The exhaust gasses then turn upward and pass through a secondary de-mister screen 46 of mesh material before coursing out the stack 48. Water remaining in the exhaust gasses as a mist will tend to impinge on secondary de-mister screen 46 and fall as droplets into lower reservoir area R.

It will be appreciated that the recovered condensate will be hot and, therefore, not be suitable for reuse for direct-contact cold water fogging unless it is cooled. Accordingly, the condensate is cooled by a heat exchanger 50 before being recirculated. In the embodiment shown, heat exchanger 50 is a tubed heat exchanger or the like which receives warm condensate from pump 44 though condensate inlet 52. The condensate flows through coils 54 and exits through an outlet 56. In marine applications, cold seawater is received through an inlet 58 and passes over coils 54 so as to cool the condensate, and the heated seawater is exhausted back to the ocean through an outlet 60. In non-marine applications, a cold heat transfer fluid such as water or air would be provided from a suitable source. The cooled condensate is then recirculated to condensers 12a, 12b through pipes 62a, 62b, respectively, for fogging. Additionally a portion of the cooled condensate is routed through outlet 64 which can be used, for example, for makeup feedwater in a steam injected gas turbine driven powerplant.

Figure 6:
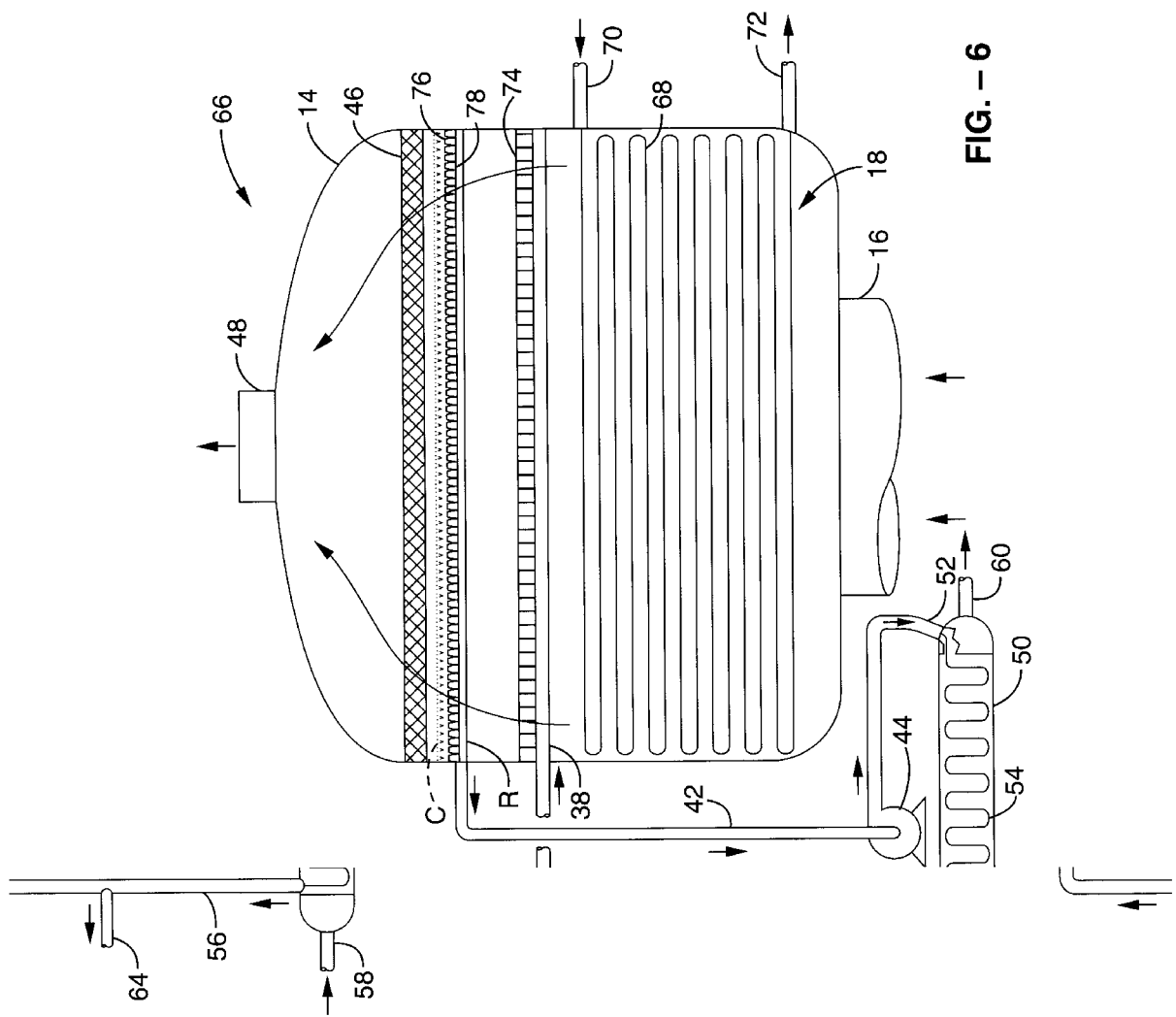
FIG. 6 is a schematic diagram of an alternative embodiment of the exhaust gas water recovery apparatus shown in FIG. 1.
Figure 7:
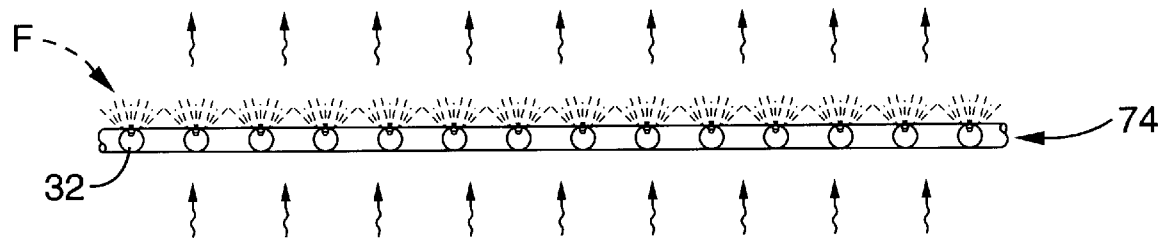
FIG. 7 is a diagrammatic view in side elevation of the fogging nozzle array employed in the apparatus shown in FIG. 6.
Figure 8:
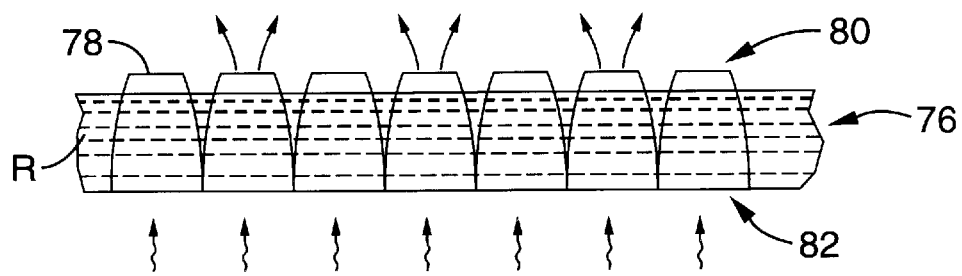
FIG. 8 is a diagrammatic view in side elevation of the condensate recovery array employed in the apparatus shown in FIG. 6.
Figure 9:
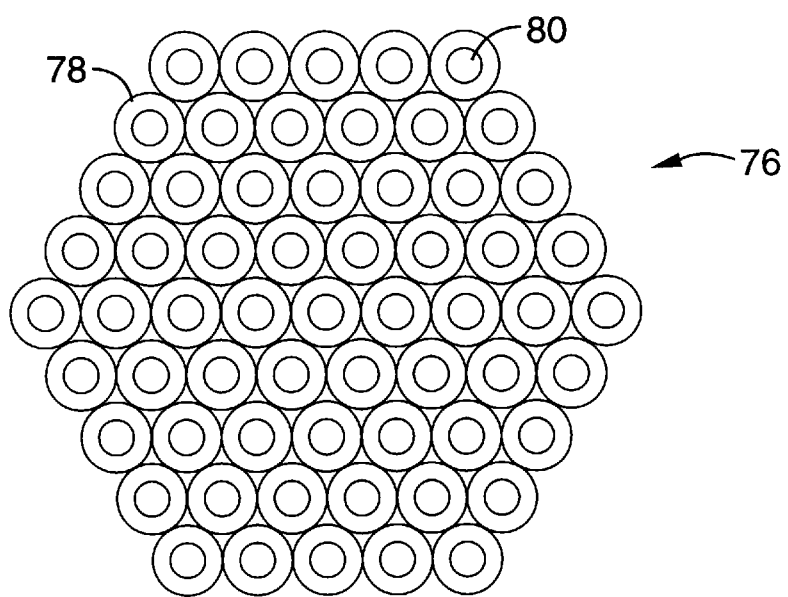
FIG. 9 is a top plan view of the condensate recovery array shown in FIG. 8.

Referring now to FIG. 6, an alternative embodiment 66 of a water recovery unit is shown which provides for a straight-through flow of exhaust gasses. Here, the exhaust heat recovery unit 18 is shown as having coils 68 with a cold fluid inlet 70 and a hot fluid outlet 72. Referring also to FIG. 7, the exhaust gasses cooled by exhaust heat recovery unit 18 flow through a nozzle array 74, having a configuration such as that shown in FIG. 2 through FIG. 5 except that the exhaust gasses now pass upward through the fog F instead of downward. Referring also to FIG. 8 and FIG. 9, the fogged and further cooled exhaust gasses then flow through a recovery array 76 having a plurality of conical shaped channels 78 wherein the diameter of the exit orifices 80 is smaller than the diameter of the entrance orifices 82 so as to increase the velocity of the exhaust gas flow. This prevents the condensate C from falling back into exit orifices 80. The exhaust gasses continue to flow upward until they impinge on the de-entrainment screen 46, which causes the droplets of water to fall downward into reservoir area R where the warm condensate is pumped out for recirculation.

With regard to the quality of the water recovered in accordance with the present invention, a problem that must be addressed where the powerplant or other combustor uses fuel that contains some sulfur is that an acid dew point exists at a temperature higher than the water dew point. In some powerplants, this potential for acid deposition on the exhaust stack and heat recovery equipment causes the equipment to be designed to allow the exhaust to escape to the atmosphere before the acid dew point is reached. However, because this water recovery apparatus of the present invention causes the exhaust gas to be cooled to the dew point of water, a method of capturing and neutralizing developing acid must be devised in order to avoid corrosion of equipment that may come in contact with such acid deposits. Fortunately, the same water fogging surface condensation strategy described herein can be employed at the point in the stack where acid condensation is expected to occur and, because the water fog will be cold, any $SO_2$ or $SO_3$ molecules that may exist at that point in the exhaust gas will preferentially condense on the surface of the fog droplets rather than on metal components. The dilute acid captured in a reservoir at that point in the stack can then be treated with barium carbonate to precipitate out highly insoluble barium sulfate and neutralize the acid. Those skilled in the art will recognize that this technique may also be employable as a low cost method of removing harmful sulfur oxide emissions, and other condensable or entrainable emissions (such as HCL or $PM_{10}$) from the stack gasses of other kinds of power plants (such as coal fired or trash burning powerplants) even if water recovery is not an objective.

In those instances in which the objective is to capture condensable materials, it will be desirable to ensure that the water fog is colder than the exhaust stream at that point and, indeed, colder than the dew point of the target condensable material in order to encourage its condensation on the surface of the fog droplets. In those situations in which the objective is to capture noncondensable materials such as dust particles, it may be advantageous to use a device such as is used in electro-static precipitators to impart an electrical charge to the target particles. If this charge is opposite the charge that exists on the surface of the fog droplets, capture of these materials will be enhanced as the solid particles will be attracted to the fog droplets and their separation from the exhaust gases with those droplets in the de-mister screen will more readily occur.

Accordingly, it will be seen that the exhaust stream water recovery unit of the present invention permits steam injected gas turbine driven powerplants, particularly those in marine applications, to be operated without an external source of water for steam raising. The present invention addresses the requirement of providing high quality water for steam injection by establishing a closed loop recovery system in which water is extracted from the exhaust gas stream and returned to the cycle. Although the description above contains many specificities, these should not be construed as limiting the scope of the invention but as merely providing illustrations of some presently preferred embodiments of this invention. Thus the scope of this invention should be determined by the appended claims and their legal equivalents.

TABLE 1

| Water Drop Dia. Microns | Grams per Drop | Molecules per Drop | SQ. CM. per Drop | Sq. CM. per Gram |
|---|---|---|---|---|
| 10000 | .5236 | 1.751146E+22 | 3.1416 | 6 |
| 5000 | .06545 | 2.188933E+21 | .7854 | 12 |
| 2500 | 8.18125E-03 | 2.736166E+20 | .19635 | 24 |
| 1250 | 1.022656E-03 | 3.420208E+19 | .0490875 | 48 |
| 625 | 1.27832E-04 | 4.27526E+18 | 1.227188E-02 | 96 |
| 312.5 | 1.5979E-05 | 5.344074E+17 | 3.067969E-03 | 192 |
| 156.25 | 1.997375E-06 | 6.680093E+16 | 7.669922E-04 | 384 |
| 78.125 | 2.496719E-07 | 8.350116E+15 | 1.91748E-04 | 768 |
| 39.0625 | 3.120899E-08 | 1.043765E+15 | 4.793701E-05 | 1536 |
| 19.53125 | 3.901124E-09 | 1.304706E+14 | 1.198425E-05 | 3072 |
| 9.765625 | 4.876405E-10 | 1.630882E+13 | 2.996063E-06 | 6144 |
| 4.882813 | 6.095506E-11 | 2.038603E+12 | 7.490158E-07 | 12288 |
| 2.441406 | 7.619383E-12 | 2.548253E+11 | 1.87254E-07 | 24576 |
| 1.220703 | 9.524228E-13 | 3.185317E+10 | 4.681349E-08 | 49152 |
| .6103516 | 1.190529E-13 | 3.981646E+09 | 1.170337E-08 | 98304 |
| .3051758 | 1.488161E-14 | 4.977057E+08 | 2.925843E-09 | 196608 |
| .1525879 | 1.860201E-15 | 6.221321E+07 | 7.314608E-10 | 393216 |
| 7.629395E-02 | 2.325251E-16 | 7776651 | 1.828652E-10 | 786432 |
| 3.814697E-02 | 2.906564E-17 | 972081 | 4.57163E-11 | 1572864 |
| 1.907349E-02 | 3.633205E-18 | 121510 | 1.142907E-11 | 3145728 |
| 9.536743E-03 | 4.541506E-19 | 15188 | 2.857269E-12 | 6291456 |
| 4.768372E-03 | 5.676883E-20 | 1898 | 7.143171E-13 | 1.258291E+07 |
| 2.384186E-03 | 7.096103E-21 | 237 | 1.785793E-13 | 2.516583E+07 |
| 1.192093E-03 | 8.870129E-22 | 29 | 4.464482E-14 | 5.033165E+07 |
| 5.960465E-04 | 1.108766E-22 | 3 | 1.116121E-14 | 1.006633E+08 |

I claim:

1. An apparatus for removing condensable materials contained in exhaust gases produced by combustion, comprising:

(a) means for receiving gases exhausted from a combustor;

(b) fogging means for generating a fog comprising water droplets having a condensing surface for recovering condensable materials and injecting said water droplets into said exhaust gases, wherein said water droplets provide substantially all of the primary condensing surface of the apparatus and condensable materials contained in said exhaust gases attach to said water droplets, said fogging means positioned downstream of said means for receiving exhaust gases; and (c) de-misting means for separating said attached water droplets and materials from said exhaust gases and producing a fluid, said de-misting means positioned downstream of said fogging means.

2. An apparatus as recited in claim 1, further comprising cooling means for cooling said exhaust gases, said cooling means positioned downstream of said means for receiving exhaust gases, said fogging means positioned downstream of said cooling means.

3. An apparatus as recited in claim 2, wherein said cooling means comprises a heat recovery unit having a fluid carrying coil, said heat recovery unit including means for transferring exhaust heat to a countercurrent flow of fluid through said fluid carrying coil.

4. An apparatus as recited in claim 2, wherein said cooling means comprises a heat recovery steam generator.

5. An apparatus as recited in claim 1, further comprising means for cooling said fluid.

6. An apparatus as recited in claim 5, further comprising means for providing said cooled fluid to said fogging means.

7. An apparatus as recited in claim 6, further comprising means for providing said cooled condensed fluid to a powerplant for steam raising and injection of raised steam into a combustor in said powerplant.

8. An apparatus as recited in claim 1, wherein said fogging means is positioned in said exhaust gas stream at a point where cooling of said exhaust gasses has approached the dew point of sulfuric or sulphurous acid contained in said exhaust gasses, and wherein said fogging means removes said acid contained in said exhaust gasses for neutralization.

9. An apparatus as recited in claim 1, wherein said materials contained in said exhaust gas comprise water vapor, said water vapor is entrained in said droplets from said fogging means, and said de-misting means coalesces said water droplets so as to produce a condensate.

10. An apparatus for removing condensable materials contained in exhaust gases produced by combustion, comprising:

(a) means for receiving gases exhausted from a combustor;

(b) a heat recovery unit having a fluid carrying coil, said heat recovery unit including means for transferring exhaust heat to a countercurrent flow of fluid through said fluid carrying coil, said heat recovery unit positioned downstream of said means for receiving exhaust gases;

(c) fogging means for generating a fog comprising water droplets having a condensing surface for recovery of condensable materials and injecting said water droplets into said exhaust gases, wherein said water droplets provide substantially all of the primary condensing surface of the apparatus and condensable materials contained in said exhaust gases attach to said water droplets, said fogging means positioned downstream of said heat recovery unit; and (d) de-misting means for separating said attached water droplets and condensable materials from said exhaust gases and producing a condensed fluid.

11. An apparatus as recited in claim 10, further comprising means for cooling said condensed fluid.

12. An apparatus as recited in claim 11, further comprising means for providing said cooled condensed fluid to said fogging means.

13. An apparatus as recited in claim 12, further comprising means for providing said cooled condensed fluid to a powerplant for steam raising and injection of raised steam into a combustor in said powerplant.

14. An apparatus as recited in claim 10, wherein said fogging means is positioned in said exhaust gas stream at a point where cooling of said exhaust gasses has approached the dew point of sulfuric or sulphurous acid contained in said exhaust gasses, and wherein said fogging means removes said acid contained in said exhaust gasses for neutralization.

15. An apparatus as recited in claim 10, wherein said heat recovery unit comprises a heat recovery steam generator.

16. An apparatus for removing condensable materials contained in exhaust gases produced by combustion, comprising:

(a) means for receiving gases exhausted from a combustor;

(b) a heat recovery unit having a fluid carrying coil, said heat recovery unit including means for transferring exhaust heat to a countercurrent flow of fluid through said fluid carrying coil, said heat recovery unit positioned downstream of said means for receiving exhaust gases;

(c) fogging means for generating a fog comprising water droplets having a condensing surface for recovering condensable materials and injecting said water droplets into said exhaust gases, wherein said water droplets provide substantially all of the primary condensing surface of the apparatus and condensable materials contained in said exhaust gases attach to said water droplets, said fogging means positioned downstream of said heat recovery unit;

(d) de-misting means for separating said attached water droplets and condensable materials from said exhaust gases and producing a condensed fluid; and (e) means for cooling said condensed fluid.

17. An apparatus as recited in claim 16, further comprising means for providing said cooled condensed fluid to said fogging means.

18. An apparatus as recited in claim 17, further comprising means for providing said cooled condensed fluid to a powerplant for steam raising and injection of raised steam into a combustor in said powerplant.

19. An apparatus as recited in claim 16, wherein said fogging means is positioned in said exhaust gas stream at a point where cooling of said exhaust gasses has approached the dew point of sulfuric or sulphurous acid contained in said exhaust gasses, and wherein said fogging means removes said acid contained in said exhaust gasses for neutralization.

20. An apparatus as recited in claim 16, wherein said heat recovery unit comprises a heat recovery steam generator.

21. An apparatus as recited in claim 1, wherein said condensable materials comprise water.

22. An apparatus as recited in claim 10, wherein said condensable materials comprise water.

23. An apparatus as recited in claim 16, wherein said condensable materials comprise water.

* * * * *